United States Patent
Park et al.

(10) Patent No.: US 9,949,070 B2
(45) Date of Patent: Apr. 17, 2018

(54) METHOD FOR POSITIONING NAN TERMINAL IN WIRELESS LAN SYSTEM, AND DEVICE USING SAME

(71) Applicant: LG ELECTRONICS INC., Seoul (KR)

(72) Inventors: Giwon Park, Seoul (KR); Byungjoo Lee, Seoul (KR); Dongcheol Kim, Seoul (KR); Hyunhee Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/555,196

(22) PCT Filed: Mar. 9, 2016

(86) PCT No.: PCT/KR2016/002308
§ 371 (c)(1),
(2) Date: Sep. 1, 2017

(87) PCT Pub. No.: WO2016/144085
PCT Pub. Date: Sep. 15, 2016

(65) Prior Publication Data
US 2018/0054698 A1    Feb. 22, 2018

Related U.S. Application Data

(60) Provisional application No. 62/129,974, filed on Mar. 9, 2015.

(51) Int. Cl.
*H04W 4/02* (2018.01)
*H04W 84/12* (2009.01)

(52) U.S. Cl.
CPC .............. *H04W 4/02* (2013.01); *H04W 84/12* (2013.01)

(58) Field of Classification Search
CPC ................................ H04W 4/02; H04W 84/12
See application file for complete search history.

(56) References Cited

U.S. PATENT DOCUMENTS 9,763,043 B2 * 9/2017 Larsen ................. H04W 4/023
2013/0177006 A1   7/2013 Baek et al.
(Continued)

FOREIGN PATENT DOCUMENTS

| WO | 2012/015287 A2 | 2/2012 |
| WO | 2013/036060 A1 | 3/2013 |
| WO | 2014/200292 A1 | 12/2014 |

OTHER PUBLICATIONS

Daniel Camps-Mur et al., "Enabling always on service discovery: Wi-Fi Neighbor Awareness Networking (NAN)", IEEE Wireless Communications Magazine, Oct. 1, 2014, pp. 1-7.

*Primary Examiner* — Brandon J Miller
(74) *Attorney, Agent, or Firm* — Dentons US LLP

(57) ABSTRACT

A method and a device for positioning a NAN terminal in a wireless LAN system are provided. A first station receives, through a service discovery frame during a preset discovery window, allocation information of an available window for reporting a location estimate value of the first station, location information of a second station located within a distance of one hop from the first station, and location information of a third station located within a distance of at least one hop from the second station. The first station determines the location estimate value of the first station on the basis of the location information of the second station and the location information of the third station. The first station reports the location estimate value of the first station during a section indicated by the allocation information of the available window.

12 Claims, 14 Drawing Sheets

(56) References Cited

U.S. PATENT DOCUMENTS

2015/0036540 A1* 2/2015 Kasslin ................ H04W 48/18
 370/254
2016/0157193 A1* 6/2016 Qi ........................ H04W 56/00
 370/350

* cited by examiner

FIG. 11

| Farther Availability Map Attribute for location estimate resource | Operation Class /Channel | Availability Interval | Availability Intervals Bitmap | | | | | | | | | | | | | | | | | |
|---|---|---|---|---|---|---|---|---|---|---|---|---|---|---|---|---|---|---|---|
| | | | 0 | 1 | 2 | 3 | 4 | 5 | 6 | 7 | 8 | 9 | 10 | 11 | 12 | 13 | 14 | 15 | ··· 28 29 30 31 |
| | Channel 6 | 16TUs | 0 | 0 | 0 | 0 | 1 | 1 | 1 | 1 | 0 | 0 | 0 | 0 | 0 | 0 | 0 | 0 | ··· 0 0 0 0 |

METHOD FOR POSITIONING NAN TERMINAL IN WIRELESS LAN SYSTEM, AND DEVICE USING SAME

CROSS-REFERENCE TO RELATED APPLICATIONS

This application is the National Stage filing under 35 U.S.C. 371 of International Application No. PCT/KR2016/002308, filed on Mar. 9, 2016, which claims the benefit of U.S. Provisional Application No. 62/129,974 filed on Mar. 9, 2015, the contents of which are all hereby incorporated by reference herein in their entirety.

BACKGROUND OF THE INVENTION

Field of the Invention

The present invention relates to wireless communication and, more particularly, to a method for measuring location of a NAN device in a wireless local area network (WLAN) system and a device using the method.

Related Art

A location-based service (LBS) refers to an application system and a service based on the application system which accurately determine location of a person or an object via a wired and mobile communication network and utilize the determined location information. In other words, LBS is a service technology that determines the position of a user of a mobile communication device such as a notebook, a PDA (Personal Digital Assistant), or a mobile phone in real-time and provides the position to the user.

To implement LBS, various positioning technologies are employed, including Global Positioning System (GPS), Wi-Fi geotagging, and triangulation based on base stations. WLAN-based Wi-Fi Positioning System (WPS) is emerging as a new positioning technology for implementing LBS.

WPS is a technology in which a device receives parameters of an RF signal (MAC address, signal strength, and the others) emitted from an access point (AP), and a WPS server calculates the location of a user by using a positioning technology that determines the location of the device with respect to the WPS and provides the calculated location to the user.

In general, a wireless communication system performs device-to-device communication via a managing medium such as a base station or an AP. A managing medium is responsible for scheduling for data communication.

However, to ensure flexibility of communication, various protocols are being proposed to implement direct communication between devices without involving a managing medium. NAN (Neighborhood Awareness Network) is a technical specification established by the WFA (Wi-Fi Alliance), which is based on the Wi-Fi standards. NAN specification defines a synchronization and a search procedure among devices in the frequency band of 2.5 GHz or 5 GHz.

Therefore, there needs a method for measuring location of a NAN device in a NAN network in which communication is performed directly between devices without involving a managing medium.

SUMMARY OF THE INVENTION

The present invention provides a method for measuring location of a NAN device in a WLAN system and a device using the method.

The present document proposes a method for measuring location of a NAN device in a WLAN system.

First of all, a first station may correspond to a NAN device that does not know its location, a second station may correspond to a NAN device located one hop away from the first station, and a third station may correspond to a NAN device knowing its location and being located within a distance of at least one hop from the second station. An availability window may correspond to an FAW by which the first station reports a location estimate.

The first station receives allocation information of an availability window, location information of the second station, and location information of the third station through a service discovery frame during a preset discovery window. The location information of the second station may include MAC address, longitude, latitude, altitude, transmission power, and place name (a string value) of the second station. The location information of the third station may include MAC address, longitude, latitude, altitude, RSSI (Received Signal Strength Indication), RTD (Round Trip Delay), and place name (a string value) of the third station. Also, since the second station is located within a distance of one hop from the first station, if the third station is located within a distance of one hop from the second station, the third station may be located within a distance of two hops from the first station.

The second station and the third station may become an anchor master knowing its location information.

The first station determines a location estimate of the first station on the basis of the location information of the second and the third station. In other words, by using the radius of received signal strength of the second station and the radius of received signal strength of the third station, the first station may estimate its location as the point at which the individual radii overlap with each other.

The first station may report the determined location estimate of the first station during a section indicated by the allocation information of an availability window. At this time, the allocation information of the availability window is represented by a bitmap, and the section indicated by the allocation information of the availability window may be configured by the bitmap after the preset discovery window is initiated. Also, the determined location estimate of the first station may be reported through a service discovery frame.

Also, the present invention proposes a wireless device performing location measurement of a NAN device in a WLAN system.

First of all, a first station may correspond to a NAN device that does not know its location, a second station may correspond to a NAN device located within a distance of one hop from the first station, and a third station may correspond to a NAN device knowing its location and being located within a distance of at least one hop from the second station. An availability window may correspond to an FAW by which the first station reports a location estimate.

The wireless device comprises a transceiver transmitting and receiving a radio signal and a processor connected to the transceiver. The processor, through a service discovery frame during a preset discovery window, receives allocation information of an availability window, location information of the second station, and location information of the third station. By using the location information of the second station and the location information of the third station, the processor determines a location estimate of the first station. The processor reports the determined location estimate of the first station during a section indicated by the allocation information of the availability window.

A NAN device that does not know its accurate location may improve location accuracy by estimating its location by using neighboring NAN devices. In particular, by using not only neighbor NAN devices located within a distance of one hop but also neighbor NAN devices located within a distance of two or more hops, more accurate location estimation may be performed. By using the method for measuring location according to the present invention, more efficient location-based services may be provided.

BRIEF DESCRIPTION OF THE DRAWINGS

FIG. 11 illustrates one example of an FAW MAP for reporting a location estimate.

DESCRIPTION OF EXEMPLARY EMBODIMENTS

A NAN (Neighbor Awareness Network) is a technical specification defined by the WFA (Wi-Fi Alliance), which is based on the Wi-Fi standard. A NAN device is a device that supports the NAN specification. A NAN device may support various communication protocols and may be part of an STA (Station) or an AP (Access Point). An STA may be fixed or mobile and may also be called a UE (User Equipment), MS (mobile station), MT (mobile terminal), UT (user terminal), SS (subscriber station), PDA (personal digital assistant), wireless modem, or a handheld device.

A NAN device may operate in the frequency band of 2.5 GHz or 5 GHz and may exchange information based on the IEEE (Institute of Electrical and Electronics Engineers) 802.11a/b/g/n/ac protocol.

A NAN device may search for a service of a nearby device by using the NAN protocol, execute an application, and use the searched service by connecting to the WLAN (Wireless Local Area Network) or other network.

Figure 1:
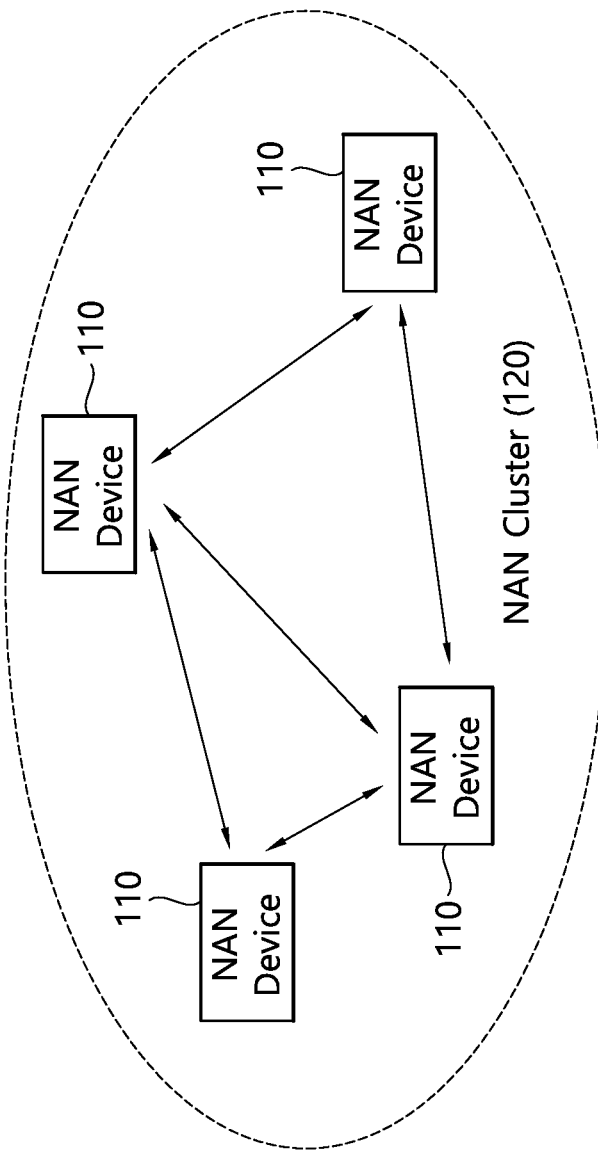
FIG. 1 illustrates a NAN cluster.
Figure 2:
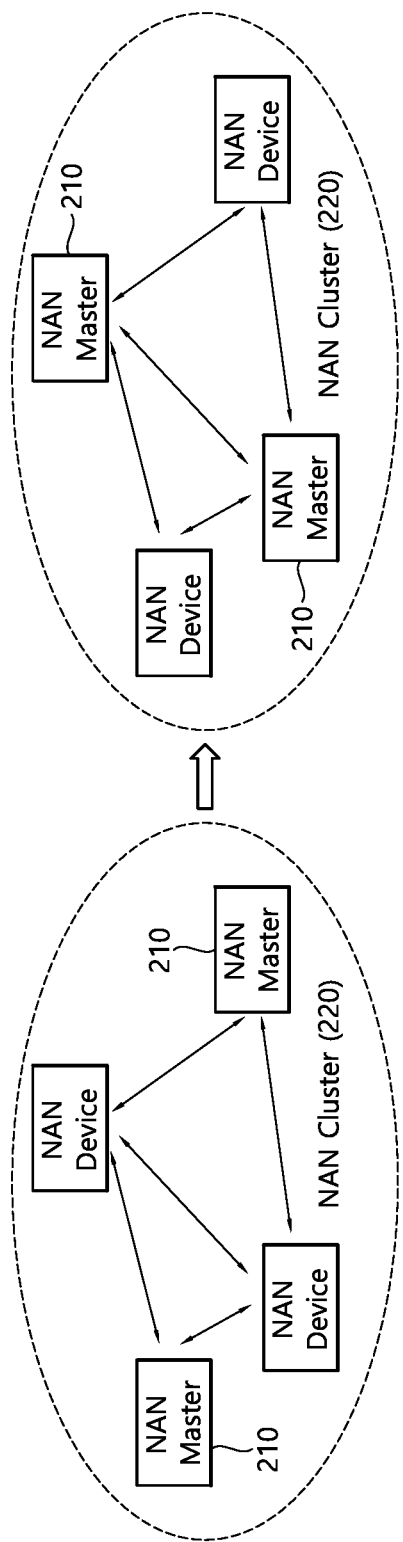
FIG. 2 illustrates a NAN cluster.

FIG. 1 illustrates a NAN cluster.
FIG. 2 illustrates a NAN cluster.

A NAN network may comprise NAN devices using a set of the same NAN parameters. The NAN parameters may include an interval between consecutive discovery windows (DWs), beacon interval, and NAN channel.

As shown in FIG. 1, the NAN devices 110 may form a NAN cluster. Here, a NAN cluster 120 uses a set of the same NAN parameters. Also, the NAN cluster 120 refers to a set of NAN devices 110 synchronized to the same discovery window schedule. A NAN device 110 belonging to the NAN cluster 120 may transmit a multicast/unicast NAN service discovery frame (SDF) to other NAN devices 110 within the range of a discovery window.

As shown in FIG. 2, a NAN cluster 220 may have one or more NAN masters 210, and the NAN master 210 may be changed. Also, the NAN master 210 may transmit all of a synchronization beacon frame, discovery beacon frame, and NAN service discovery frame.

A synchronization beacon frame is used for synchronization of NAN devices within a NAN cluster. A discovery beacon frame is used for advertisement so that a NAN device not belonging to a NAN cluster may discover the NAN cluster. A service discovery frame is used for exchanging information about a service among NAN devices.

In what follows, described will be architecture of a NAN device.

Figure 3:
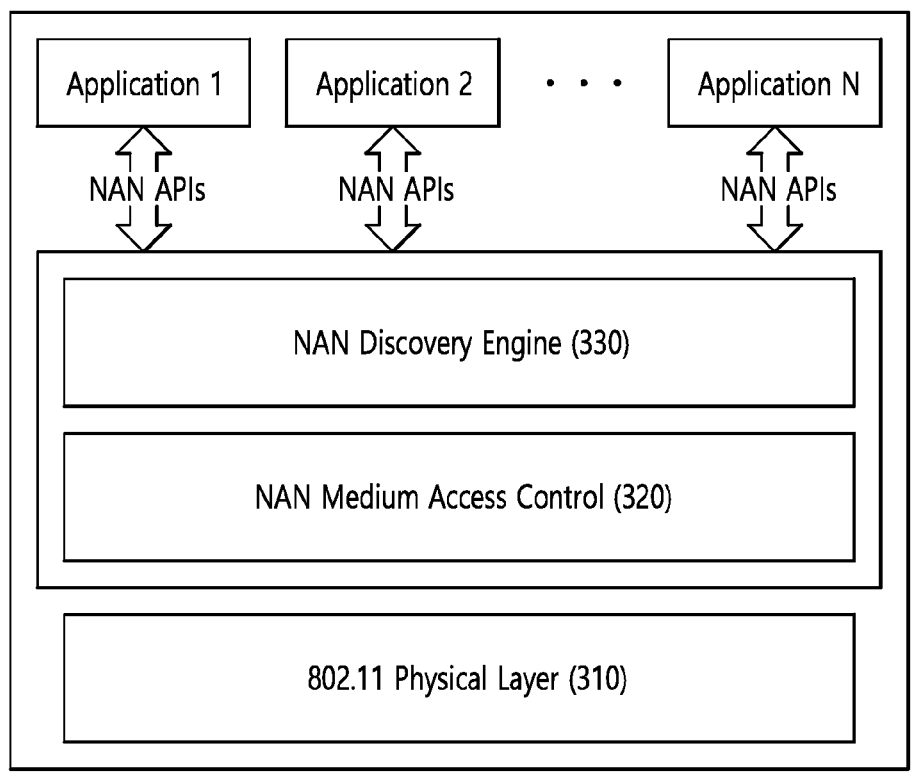
FIG. 3 illustrates the structure of a NAN device.

FIG. 3 illustrates the structure of a NAN device.

As shown in FIG. 3, a NAN device is based on the physical layer 310 of the IEEE 802.11 specification, the primary components of which include a NAN discovery engine 330, NAN MAC (Medium Access Control) 320, and NAN APIs for individual applications Application 1, Application 2, . . . , Application N.

Figure 4:
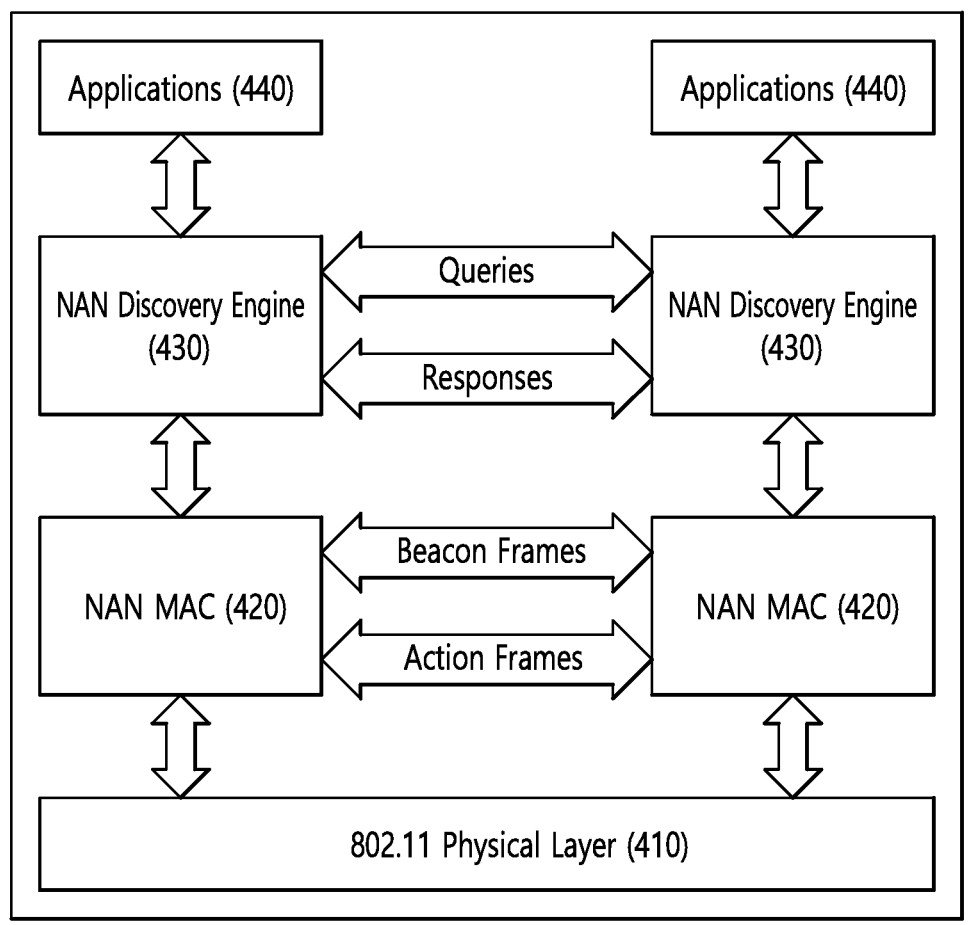
FIG. 4 illustrates the relationship between NAN components.

FIG. 4 illustrates the relationship between NAN components.

Figure 5:
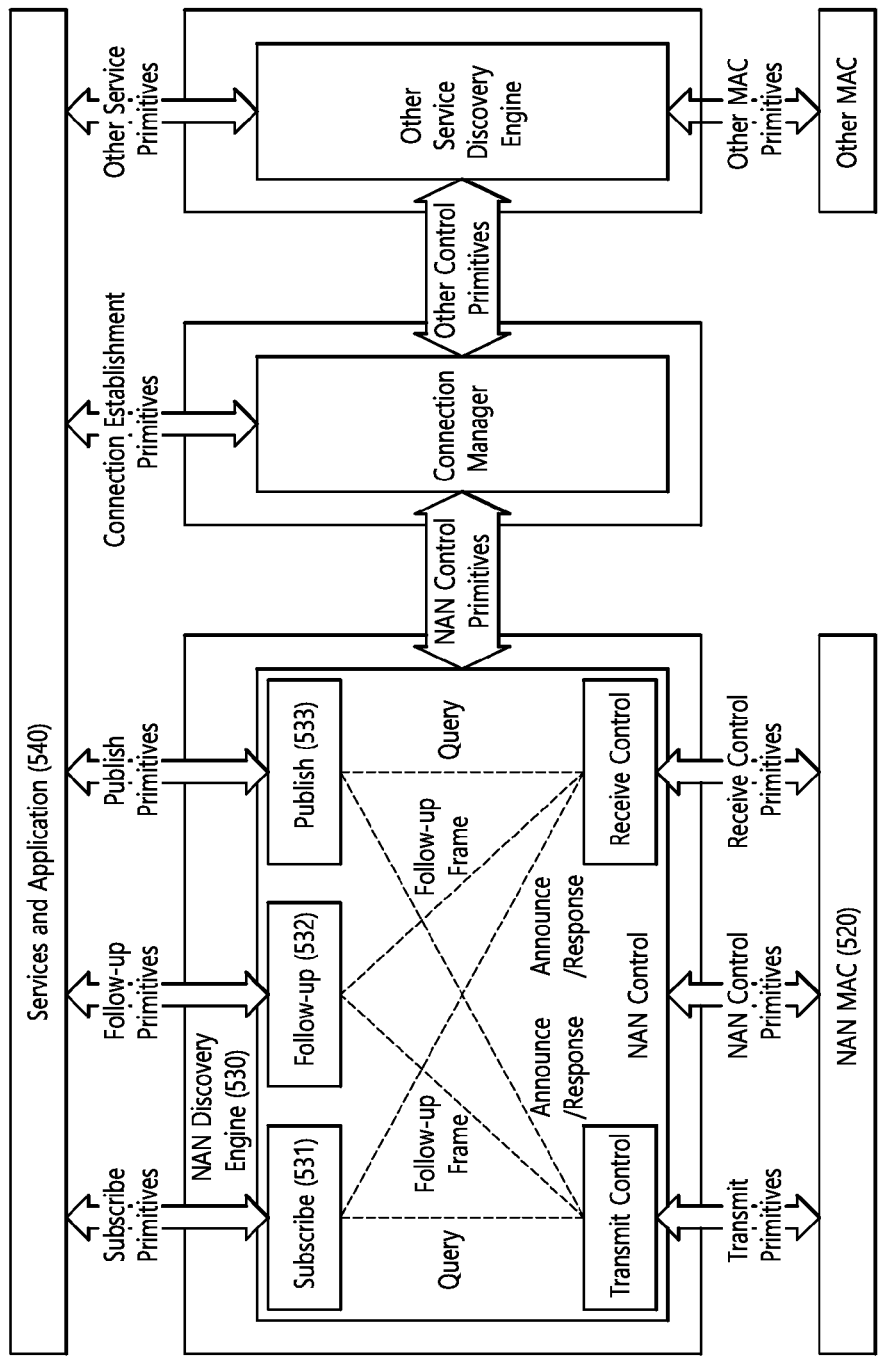
FIG. 5 illustrates the relationship between NAN components.

FIG. 5 illustrates the relationship between NAN components.

Service queries and responses are handled by the NAN discovery engine 430, 530, and the NAN MAC 420, 520 processes NAN beacon frames and NAN service discovery frame. The NAN discovery engine 430, 530 may provide such functions as subscribe 531, publish 533, and follow-up 532. The publish/subscribe 531, 533 function operates through a service interface provided by a service/application 540. If the publish/subscribe 531, 533 command is executed, an instance with a publish/subscribe 531, 533 function is generated. Each instance is operated independently, and depending on implementations, several instances may be operated simultaneously. A follow-up function 532 is a means for a service/application 540 transmitting and receiving service-specific information.

In what follows, the roles and states of a NAN device will be described.

Figure 6:
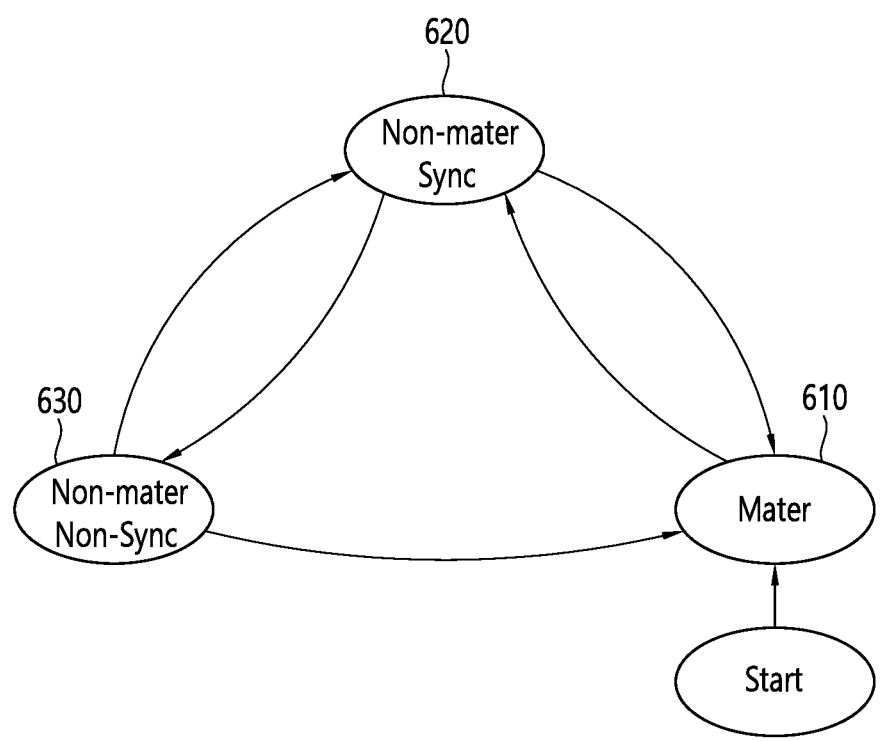
FIG. 6 illustrates state transition of a NAN device.

FIG. 6 illustrates state transition of a NAN device.

As described briefly above, a NAN device may perform the role of a master, which may also be changed. In other words, a NAN device may transition to one of various roles and states, the examples of which are shown in FIG. 6. The roles and states that may be assumed by the NAN device include a master (in what follows, the master indicates the master role and sync. state, 610), non-master sync 620, and non-master non-sync 630. According to the individual roles and states, whether to transmit the discovery beacon frame and/or synchronization beacon frame may be determined, which is summarized in Table 1.

TABLE 1

| Role and State | Discovery Beacon | Synchronization Beacon |
|---|---|---|
| Master | Transmittable | Transmittable |
| Non-Master Sync | Non-transmittable | Transmittable |
| Non-Master Non-Sync | Non-transmittable | Non-transmittable |

The state of the NAN device may be determined through a master rank (MR). The master rank represents the intent of a NAN device to act as a NAN master. In other words, a large master rank indicates a high preference to a NAN master. The NAN MR may be determined by Eq. 1 using the master preference, random factor, and device MAC address.

[Eq. 1]

$$MasterRank = MasterPreference*2^{56} + RandomFactor*2^{48} + MAC[5]*2^{40} + \ldots + MAC[0]$$

The master preference, random factor, and device MAC address may be indicated by the master indication attribute included in the NAN beacon frame. The master indication attribute may be defined as shown in Table 2 below.

TABLE 2

| Field Name | Octets | Value | Description |
|---|---|---|---|
| Attribute ID | 1 | 0x00 | identifies the type of NAN attribute |
| Length | 2 | 2 | Length of the following field in the attribute |
| Master Preference | 1 | 0-255 | Information that is used to indicate a NAN Devices preference to serve as the role of Master, with a larger value indicating a higher preference. |
| Random Factor | 1 | 0-255 | A random number selected by the sending NAN Device |

With respect to the MR, a NAN device which activates a NAN service and starts a NAN cluster sets the master preference and the random factor to zero; and resets the NANWarmUp. The NAN device has to set the master preference field value within the master indication attribute to a value larger than zero until the NANWarmUp is completed and set the random factor within the master indication attribute to a new value. A NAN device which has joined a NAN cluster in which the master preference of an anchor master is set to a value larger than zero may set the master preference to a value larger than zero irrespective of whether NANWarmUp is completed or not and set the random factor to a new value.

Next, the NAN device may become an anchor master of a NAN cluster depending on the MR value. In other words, all of the NAN devices are capable of operating as an anchor master. An anchor master is such a device that has the largest MR in the NAN cluster, zero HO (Hop count to the Anchor master) value, and the smallest AMBTT (Anchor Master Beacon Transmit Time) value. Although two anchor masters may exist temporarily in the same NAN cluster, it is preferable to have only one anchor maser. The NAN device which has become the anchor master in the existing NAN cluster uses the TSF used in the existing NAN cluster.

A NAN device may become an anchor master if the following conditions are met: the NAN device starts a new NAN cluster, the master rank is changed (the MR values of other NAN devices are changed or the MR value of the anchor master itself is changed), or a beacon frame of a current anchor master is no longer received. Also, when the MR values of other NAN devices are changed or the MR value of the anchor master itself is changed, the NAN device may lose the position as the anchor master. The anchor master may be determined by the anchor master selection algorithm described below. In other words, anchor master selection determines which NAN device becomes the anchor master of a NAN cluster, where each NAN device activates the anchor master selection algorithm when it joins the NAN cluster.

When a NAN device starts a new NAN cluster, the NAN device becomes the anchor master of the new NAN cluster. A NAN synchronization beacon frame having a hop counter exceeding a threshold is not used by the NAN device. Other NAN synchronization beacon frames the hop counter of which does not exceed the threshold are used to determine the anchor master of the NAN cluster.

Receiving a NAN synchronization beacon frame the hop counter of which does not exceed the threshold, the NAN device compares a stored anchor master rank value with the anchor master rank value within the beacon frame. If the stored anchor master rank value is larger than the anchor master rank value within the beacon frame, the NAN device discards the anchor master rank value within the beacon frame. If the stored anchor master rank value is smaller than the anchor master rank value within the beacon frame, the NAN device newly stores the anchor master rank value within the beacon frame and the hop counter value each incremented by one; and AMBTT value within the beacon frame. Also, if the stored anchor master rank value is the same as the anchor master value within the beacon frame, the NAN device compares the stored anchor master rank value with the hop counter. If the hop counter value of the beacon frame is larger than the stored value, the NAN device ignores the received beacon frame. When the hop counter value of the beacon frame (stored value 1) is the same as the stored value, but the AMBTT value is larger than the stored value, the NAN device newly stores the AMBTT value of the beacon frame. If the hop counter value of the beacon frame (stored value 1) is smaller than the stored value, the NAN device increases the hop counter value of the beacon frame by 1. The stored AMBTT value is updated according to the following rule. When the received beacon frame is received from a NAN master or a device rather than the master sync, the AMBTT value is set to the value included in the NAN cluster attribute of the received beacon.

Meanwhile, if the TSF timer of the NAN device exceeds the stored AMBTT value more than 16*512 TUs (for example, 16 DS periods), the NAN device may regard itself as the anchor master and update an anchor master record. Also, when there is a change in any of the elements belonging to the MR (master preference, random factor, and MAC address), NAN devices other than the anchor master compare the changed MR values with their stored values. When the changed MR value of the NAN device is larger than the stored value, the NAN device may regard itself as the anchor master and update the anchor master record.

Also, except for the case in which the anchor master sets the AMBTT value to the TSF value for the corresponding beacon transmission, the NAN device may set the NAN synchronization and anchor master field of the cluster attribute within the discovery beacon frame to the value contained in the anchor master record. A NAN device which transmits the NAN synchronization or discovery beacon frame may guarantee that the TSF value of a beacon frame is derived from the same anchor master included in the cluster attribute.

Also, 1) when a NAN beacon indicates a value larger than the anchor master record of the NAN device; or 2) when the NAN beacon indicates an anchor master rank having the same value as the anchor master record of the NAN device, and the hop counter value and AMBTT value of the NAN beacon frame indicate a value larger than the anchor master record, the NAN device may apply the TSF timer value within the NAN beacon received by using the same cluster ID.

In what follows, NAN synchronization will be described.

NAN devices participating in the same NAN cluster may be synchronized by a common clock. The TSF of a NAN cluster may be implemented by a distributed algorithm which has to be executed in all of the NAN devices. Each NAN device participating in the NAN cluster may transmit NAN synchronization beacon frames according to the algorithm. Each device may synchronize its clock during a discovery window (DW). The length of a DW is 16 TUs. During the DW, one or more NAN devices may transmit synchronization beacon frames to help all of the other NAN devices synchronized to the clock of the former NAN devices.

Transmission of NAN beacons is performed in a distributed manner. Transmission time of a NAN beacon frame is the DW interval defined every 512 TUs. All of the NAN devices may participate in generation and transmission of NAN beacons depending on the roles and status of the respective devices. Each NAN device has to maintain its own TSF timer used for NAN beacon period timing. The NAN synchronization beacon interval may be established by the NAN device generating a NAN cluster. A series of TBTTs are defined so that DW intervals in which synchronization beacon frames are transmitted may be set apart precisely by 512 TUs. The 0 time is defined as a first TBTT, and a discovery window starts from each TBTT.

Each NAN device which performs the role of a master transmits NAN discovery beacon frames outside the NAN discovery window. On average, a NAN device functioning as a master transmits a NAN discovery beacon every 100 TUs. The time interval between consecutive NAN discovery beacons transmitted by the same NAN device is less than 200 TUs. If scheduled transmission time overlaps the NAN discovery window of the NAN cluster in which NAN devices participate, the NAN device performing the master role may omit transmission of NAN discovery beacons. To minimize power for transmission of NAN discovery beacon frames, the NAN device performing the master role may use AC_VO (WMM Access Category—Voice) contention setting.

Figure 7:
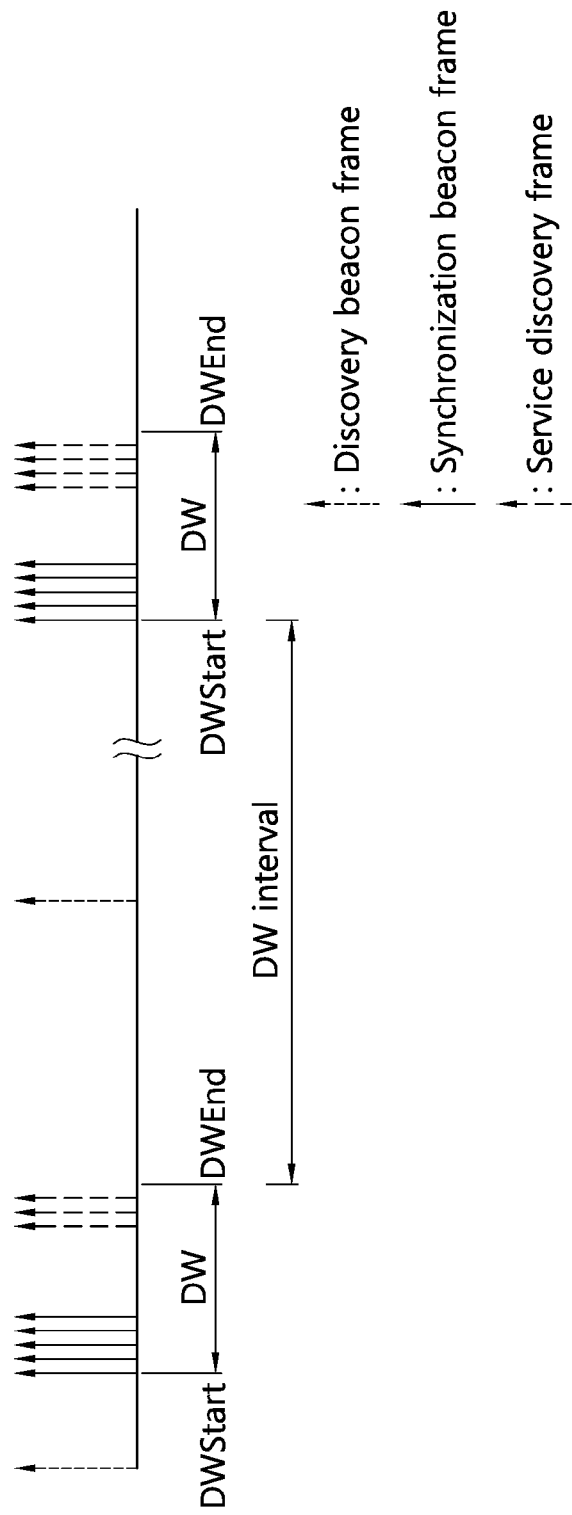
FIG. 7 illustrates the operation in a discovery window.

FIG. 7 illustrates the operation in a discovery window.

A discovery window (DW) may be regarded as the time or channel to which NAN devices converge.

During a discovery window, one or more NAN devices transmit a synchronization beacon frame, by which all of the NAN devices within a NAN cluster may be synchronized. One NAN device may transmit one synchronization beacon frame during one discovery window.

Between the discovery windows, one or more NAN devices transmit discovery beacon frames so that NAN devices may discover the NAN cluster.

During the discovery window, NAN devices may transmit contention-based service discovery frames. A NAN device initiates a backoff timer set to an arbitrary value and transmits a service discovery frame when the value of the backoff timer becomes zero.

The present invention proposes a method for measuring location of a NAN device in the WLAN system. Before describing a method for measuring location of a NAN device, FIG. 8 first describes a method for measuring location through a managing medium such as an AP. FIG. 9 illustrates a method for measuring location of a NAN device in a NAN network in which devices communicate directly without involving a managing medium.

For the convenience of description, terms used in this document are described. First, an STA refers to an arbitrary functional medium including the Medium Access Control (MAC) interface and physical layer interface for a wireless medium, compliant with the IEEE (Institute of Electrical and Electronics Engineers) 802.11 standard and include both of AP and non-AP stations in a broad sense. A non-AP STA is an STA which is not an AP, which may be called alternatively a mobile terminal, wireless device, Wireless Transmit/Receive Unit (WTRU), User Equipment (UE), Mobile Station (MS), or mobile subscriber unit. In what follows, for the convenience of description, the non-AP STA is called an STA. Also, an NAN device may refer to an STA belonging to a NAN network, which performs device-to-device direct communication without involving a managing medium such as an AP.

Figure 8:
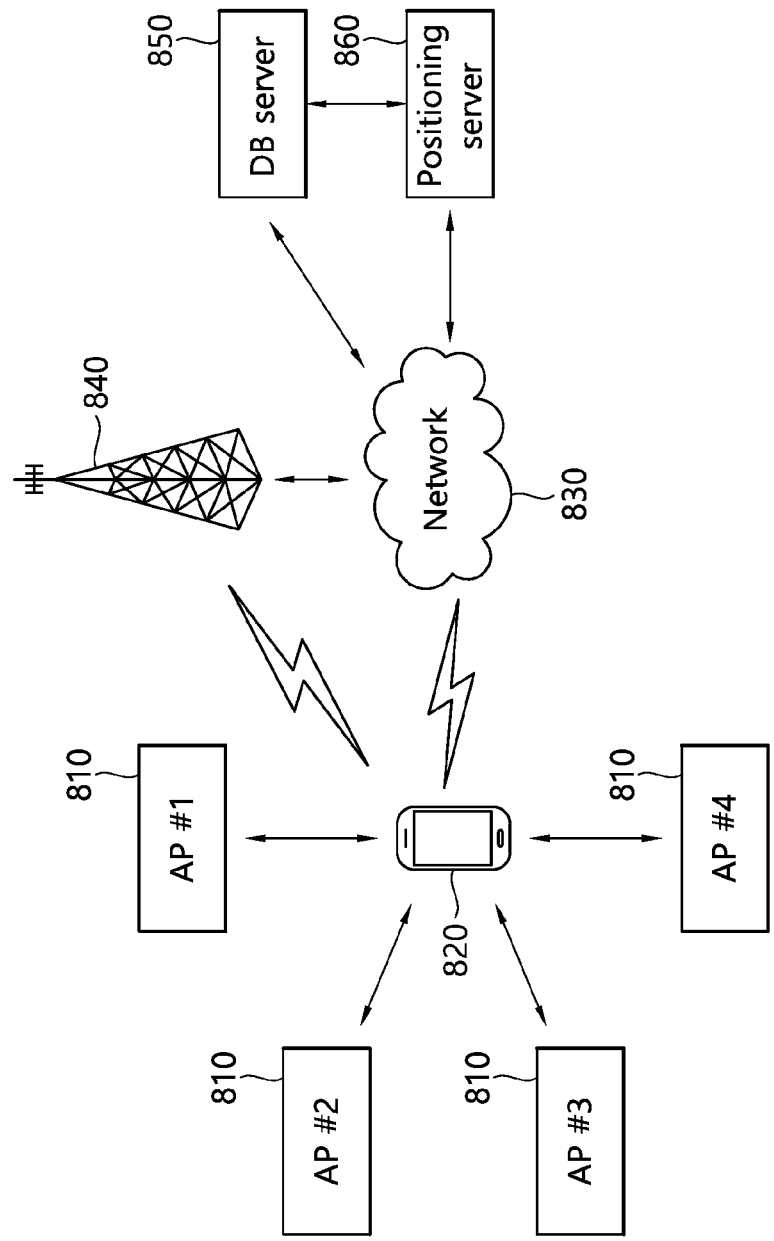
FIG. 8 illustrates a location system based on APs.
Figure 9:
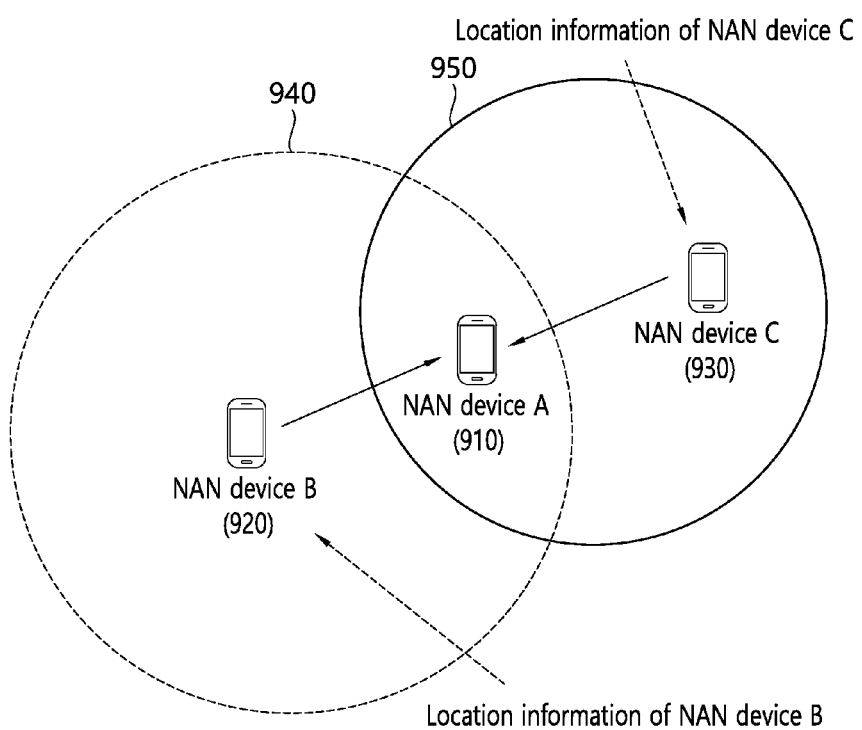
FIG. 9 illustrates one example of a method for measuring location of a NAN device to which an embodiment of the present invention is applied.

FIG. 8 illustrates a location system based on APs.

Referring to FIG. 8, a location system of FIG. 8 comprises an STA 820 transmitting information of an AP 810 via a network 830 or a mobile communication network 840, which is in the vicinity of the STA and may be communicated with the STA, a DB server 850 pre-storing location information about the AP 810, and a location server 860. The location server 860 determines the location of the STA 820 by using the location information and signal strength of the AP 810 corresponding to the AP information received from the STA 820 and calculates accurate coordinates on the basis of relative distances and the number of APs 810 corresponding to the AP information.

The STA 820 transmits the information of APs that may be communicated with the STA from among a plurality of APs installed in a specific area via the network 830 or the mobile communication network 840. Here, the information of an AP may include at least one of a unique identification number and installation location of the AP. Also, the network 830 should be interpreted in a broad sense, referring to not only a wireless Internet network such as a short wireless network based on Bluetooth or IrDA (Infrared Data Association); and WiBro (Wireless Broadband) but also a wired network such as a VAN (Value Added Network). Also, the mobile communication network 840 may include a CDMA (Code Division Multiple Access) network and a WCDMA (Wideband CDMA) network.

A method for measuring location for providing a location-based service (LBS) to an STA is divided into a network-based method in which location of the STA is determined by software from utilization of properties of a radio environment within a cell-radius of a base station of a mobile communication network, a handset based method utilizing a GPS receiver installed in the STA, and a hybrid method combining the two methods.

A-GPS is a handset-based method, which may be used both in the GSM (Global System for Mobile communication)-based network in Europe using TDMA (Time Division Multiple Access) radio access and the IS-95 based network using CDMA radio access. In the GSM radio access network, location of an STA is determined through communication of messages using the OMA SUPL (Secure User Plane Location) interface, used as a conduit between a mobile terminal equipped with a GPS receiver and an SPC (SUPL Positioning Center) within the GSM network, and SUPL POS (GSM A-GPS protocol containing RRLP (Radio Resource Location Protocol)), which is a protocol for A-GPS based positioning. Location of an STA is determined very accurately in the GSM radio access network since positioning utilizes four or more GPS satellite signals received. An A-GPS system comprises an SPC (SUPL Positioning Center) that obtains satellite signals received by an STA and calculates location; and an SLC (SUPL Location Center) that processes calculation from base station information within the GSM mobile communication network or associating the calculation with other system.

E-OTD (Enhanced Observed Time Difference) is a typical network-based positioning method popular in Europe which uses TDMA-based GSM radio access network; the E-OTD has been standardized by the GSM standard committees through the LCS Release 98 and 99. According to the E-OTD method, an STA determines its location by measuring relative arrival time of signals received from three or more base stations and calculating difference of distances. The E-OTD method is a network-based positioning technique, which combines the time difference conceptions such as OTD (Observed Time Difference), RTD (Relative Time Difference), and GTD (Geometric Time Difference).

OTD refers to the arrival time difference of signals from two base stations to a mobile terminal and may be calculated by measuring UE Rx-Tx time difference type 2 parameter of a GSM-based STA.

RTD is a parameter for calculating the start time difference of signals transmitted from two base stations but requires a separate measurement device, LMU (Location Measurement Unit), to be installed in the base station. Therefore, to obtain the key parameter "GTD=OTD−RTD", which is required for calculating network-based location recommended by the GSM standard, and to calculate the E-OTD based network location, not only the OTD but also the RTD needs to be determined.

A network-based positioning technology transmits to a positioning server the data (PPM, OTD, RTD, and so on) measured by an STA and an LMU according to the protocol (IS-801, RRLP, RRC, and so on) defined between the STA and the server; and performs a positioning function of the corresponding mobile terminal in the positioning server by using the measurements (PPM, OTD, RTD, and so on) of the STA. The positioning server performs network-based positioning (a method other than the GPS-based positioning and performed at a server-side for determining location of a terminal which has requested positioning) and transmits the positioning result to a target (SLC, CP (Contents Provider), STA which has requested a service, and so on) which has requested a positioning service.

The network-based positioning technology described above employs triangulation that uses coordinates and distances of three or more APs (Access Points) the locations of which are generally known in advance. The network-based positioning technology is largely divided into methods that use measured (estimated) distance information and methods that do not use distance information.

A method employing distance information first measures individual distances from three or more APs to an STA the location of which is in question. The location of the STA is obtained by performing triangulation based on the measured distances and location information of the APs. At this time, the distance between the STA and the AP is measured (estimated) by using such methods as ToA (Time of Arrival), TDOA (Time Difference Of Arrival), and RSS (Received Signal Strength)

ToA measures distance by using the time that a signal the propagation speed of which is known travels between an AP and an STA. TDOA is a method for measuring distance by using the time difference of arrival of signals with different propagation speeds transmitted simultaneously from two APs. These two methods provide more accurate results as low speed signals are used, and no obstacles are present between the APs.

RSS is a method for measuring distance by using strength of a received signal that has arrived a node. Since the RF signal utilized by the RSS technique exhibits better refraction characteristics than ultrasonic or sound waves, LoS may be easily secured, and no additional hardware is needed.

A location sensing method that does not utilize distance information includes a centroid method and an APIT (Approximate Point In Triangulation) method. These methods have been devised from an observation that methods utilizing distance information in a multi-hop sensor network may spread an error over the network.

A centroid method is a method in which, if individual APs arranged in a regular manner transmit their location information to their neighbor APs, the neighbor APs compare strength of signals received from preceding APs and estimate (measure) their location. The more regularly the APs are arranged, the larger the number of APs that may communicate with themselves, and the more uniformly the RF propagation environment is maintained, more accurate measurement results may be obtained from the centroid method.

The APIT method estimates location of an STA by determining whether the STA belongs to a triangular area formed by individual APs.

In what follows, a method for measuring location of a NAN device in a NAN network is proposed.

FIG. 9 illustrates one example of a method for measuring location of a NAN device to which an embodiment of the present invention is applied.

FIG. 9 illustrates a method for a NAN device A 910 to measure its location. Here, it is assumed that the NAN device B 920 and the NAN device C 930 know their location. Therefore, the NAN device B 920 and C 930 may operate as an anchor master of a NAN cluster.

The NAN device A 910 receives location information of the NAN device B 920 from the NAN device B 920 which is a neighbor device of the NAN device A 910. Also, the NAN device A 910 receives location information of the NAN device C 930 from the NAN device C 930 which is also a neighbor device of the NAN device A 910. Here, the NAN device B 920 and the NAN device C 930 are located within a distance of one hop away from the NAN device A 910.

The NAN device A 910 may estimate its location by using the received location information of the NAN device B 920 and the NAN device C 930. More specifically, as shown in FIG. 9, the NAN device A 910 may determine that it is located at either of the intersection points formed by overlapping of a circle representing the radius 940 of the NAN device B and a circle representing the radius 950 of the NAN device C. The radius of the NAN device B may represent the strength of a signal received from the NAN device B. The radius of the NAN device C may represent the strength of a signal received from the NAN device C.

Figure 10:
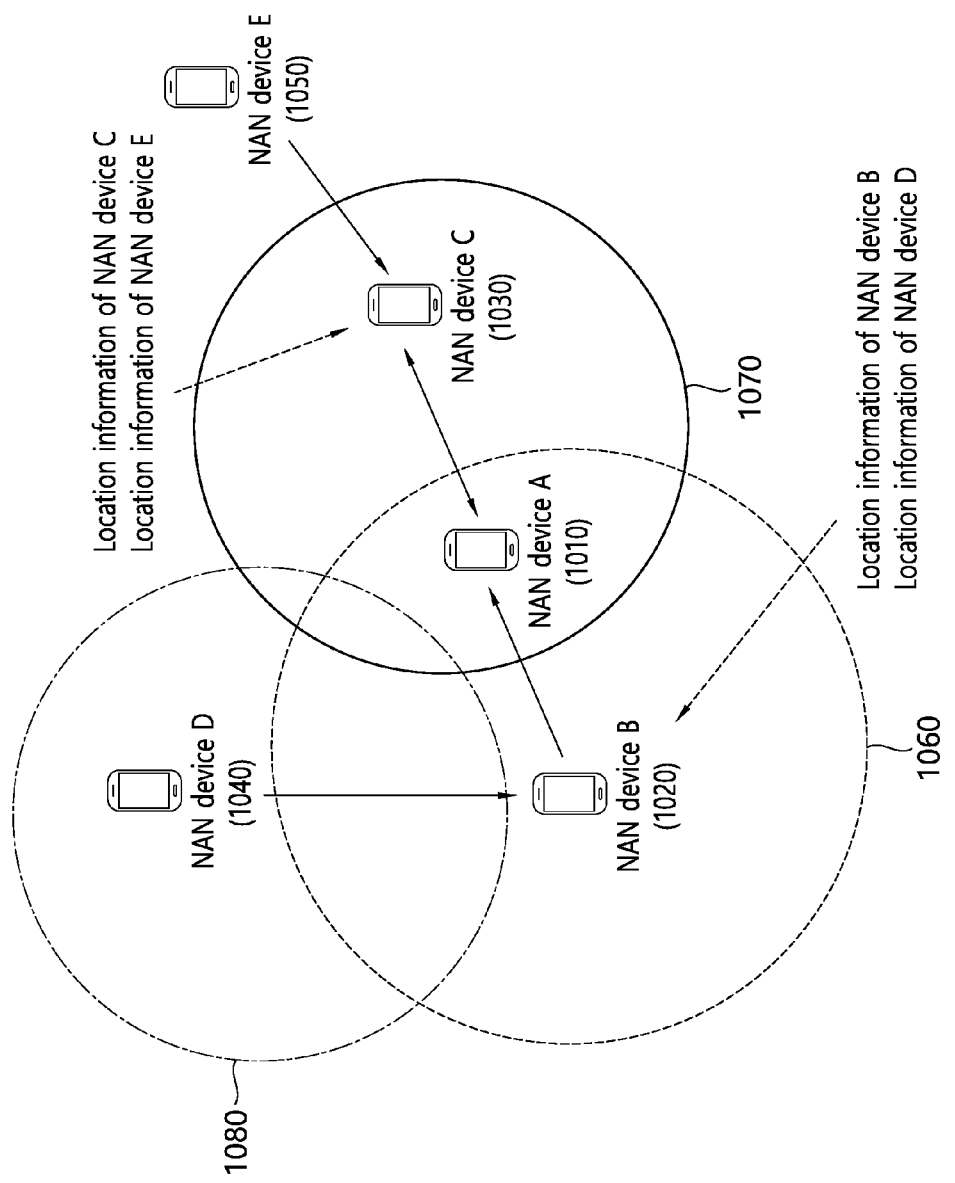
FIG. 10 illustrates another example of a method for measuring location of a NAN device to which an embodiment of the present invention is applied.

FIG. 10 illustrates another example of a method for measuring location of a NAN device to which an embodiment of the present invention is applied.

FIG. 10 illustrates a method for the NAN device A 1010 to measure its location. Here, it is assumed that the NAN device B 1020 and the NAN device C 1030 know their location. Also, it is also assumed that the NAN device D 1040 and the NAN device E 1050 know their location. Therefore, the NAN device B, C, D, E (1020, 1030, 1040, 1050) may operate as an anchor master of a NAN cluster.

The NAN device A 1010 receives location information of the NAN device B 1020 from the NAN device B which is a neighbor NAN device of the NAN device A 1010. Also, the NAN device A 1010 receives location information of the NAN device C 1030 from the NAN device C 1030 which is a neighbor NAN device of the NAN device A 1010. Here, the NAN device B 1020 and the NAN device C 1030 are located within a distance of one hop away from the NAN device A 1010.

Also, the NAN device B 1020 receives location information of the NAN device D 1040 which is a neighbor NAN device of the NAN device B 1020 and transmits the location information of the NAN device D 1040 to the NAN device A 1010. Also, the NAN device C 1030 receives location information of the NAN device E 1050 which is a neighbor NAN device of the NAN device C 1030 and transmits the location information of the NAN device E 1050 to the NAN device A 1010. Here, the NAN device D 1040 is located within a distance of one hop away from the NAN device B 1020. The NAN device E 1050 is located within a distance of one hop away from the NAN device C 1030.

The NAN device A 1010 may estimate its location by using not only the received location information of the NAN device B 1020 and the NAN device C 1030 but also the location information of the NAN device D 1040 and the NAN device E 1050. In this document, for the convenience of description, the location information of the NAN device E 1050 is not counted, but the embodiment of the present invention is not limited to this situation.

More specifically, as shown in FIG. 10, the NAN device A 1010 may determine that it is located at one of the intersection points formed by overlapping of a circle representing the radius 1060 of the NAN device B, a circle representing the radius 1070 of the NAN device C, and a circle representing the radius 1080 of the NAN device D. The radius of the NAN device B may represent the strength of a signal received from the NAN device B. The radius of the NAN device C may represent the strength of a signal received from the NAN device C. The radius of the NAN device D may represent the strength of a signal received from the NAN device D.

Compared with the case of FIG. 9 in which the NAN device A estimates its location as the intersection point at which a circle representing the radius of the NAN device B and a circle representing the radius of the NAN device C overlap with each other, FIG. 10 describes a situation in which the NAN device A estimates its location as the intersection point formed by adding another circle representing the NAN device D. In other words, in FIG. 10, the NAN device A may estimate its location more accurately by obtaining the location information of the NAN device D.

Therefore, the NAN device A may estimate its location more accurately when the location information of a NAN device located two or more hops away is obtained as shown in FIG. 10 than when only the location information of a NAN device located within a distance of one hop is obtained as shown in FIG. 9. The method described above may be useful when the number of neighbor NAN devices located within a distance of one hop from the NAN device A is two or less.

The location information element of a NAN device (NAN device B, NAN device C) located within a distance of one hop from the NAN device A is described in Table 3 below. Here, the NAN device located within a distance of one hop from the NAN device A is called a neighbor device.

TABLE 3

| Field | Value |
|---|---|
| Cluster ID | |
| NAN MAC address | MAC address of a NAN device transmitting location information element |
| Longitude | Longitude value of a NAN device having a NAN MAC address |
| Latitude | Latitude value of a NAN device having a NAN MAC address |
| Altitude | Altitude value of a NAN device having a NAN MAC address |
| Transmit power | Transmission power of a NAN device having a NAN MAC address |
| Value name | Place name (string value) |

Referring to Table 3, the location information element of a NAN device (NAN device B, NAN device C) located within a distance of one hop from the NAN device A may include the cluster ID, NAN MAC address, longitude, latitude, altitude, transmission power, and place name of a NAN device (NAN device B, NAN device C) located within a distance of one hop from the NAN device A.

The location information element of a NAN device located within a distance of two hops from the NAN device A (namely NAN device D located within a distance of one hop from the NAN device B and NAN device E located within a distance of one hop from the NAN device C) is described in Table 4 below. Here, the NAN device located within a distance of two hops from the NAN device A is called a neighbor device of a neighbor device or a neighbor NAN device of a neighbor device.

TABLE 4

| Field | Value |
|---|---|
| Number of 1 hop neighbor NAN devices For(i=0; i<Number of 1 hop neighbor NAN devices; i++){} | The number of neighbor NAN devices of a neighbor device located within a distance of one hop from the neighbor device This algorithm is used when the number of neighbor NAN devices of a neighbor device located within a distance of one hop from a neighbor device is at least one or more, for obtaining location information element of a neighbor NAN device of each neighbor device |
| Cluster ID | |
| NAN MAC address | MAC address of a neighbor NAN device of a neighbor device |
| Longitude | Longitude value of a neighbor NAN device of a neighbor device |
| Latitude | Latitude value of a neighbor NAN device of a neighbor device |
| RSSI (Received Signal Strength Indication) | Strength of a signal received from a neighbor NAN device of a neighbor device |
| RTD (Round Trip Delay) | RTD with respect to a neighbor NAN device of a neighbor device |
| Value name | Place name (string value) |

Referring to Table 4, the location information element of a NAN device (NAN device D and NAN device E) located within a distance of two hops from the NAN device A may include the cluster ID, NAN MAC address, longitude, latitude, altitude, transmission power, and place name of a NAN device (NAN device D, NAN device E) located within a distance of two hops from the NAN device A.

The location information element of Table 3 and Table 4 may be transmitted and received by being included in a service discovery frame, synchronization beacon frame, discovery beacon frame, association request frame, association response frame, probe request frame, or probe response frame.

Figure 12:
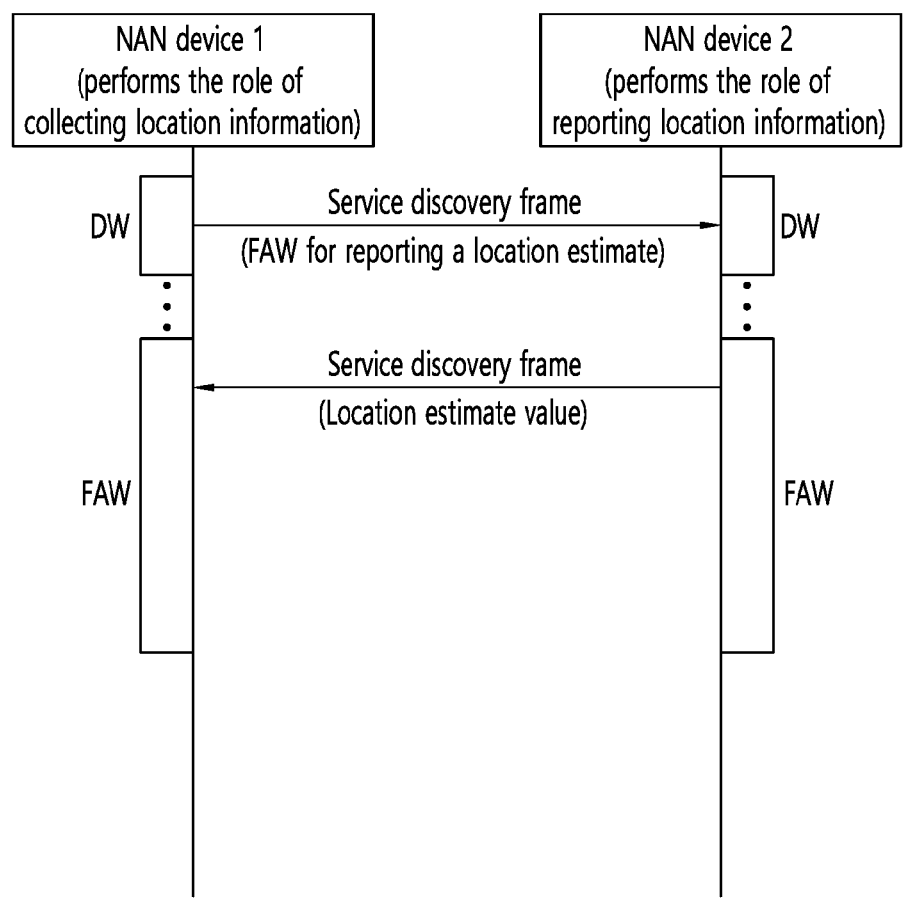
FIG. 12 illustrates one example of a procedure for allocating an FAW MAP for reporting a location estimate.

In what follows, not only a method for a NAN device to estimate its location but also a method for reporting a location estimate will be described. As shown in FIGS. 11 and 12 below, an embodiment of the present invention proposes attributes of an FAW (Further Availability Window) Map used for reporting a location estimate.

FIG. 11 illustrates one example of an FAW MAP for reporting a location estimate.

In a NAN network, a discovery window (DW) occurs every 512 ms interval. An FAW may be configured by a bitmap, and the bitmap of the FAW may occupy 16 ms for each window unit and may be divided into 32 window units (512 ms).

Referring to FIG. 11, it is assumed that an operating class and/or channel is constant. Here, it is assumed that the operating class and/or channel is set to channel 6, but the present invention is not limited to the aforementioned assumption. The availability window is assumed to be 16 TUs.

A NAN device estimating its location receives allocation information of the FAW MAP of FIG. 11. Afterwards, during the section indicated by the allocation information of a received FAW MAP, the NAN device (which performs the role of reporting location information) may report its location estimate to the NAN device which has transmitted the allocation information of the FAW MAP (which performs the role of collecting and transmitting location information). According to one example of FIG. 11, the NAN device (which performs the role of reporting location information) may report a location estimate for 64 ms (ranging 4 to 7 window units) after 64 ms (four window units ranging from 0 to 4) from the time the discovery window is initiated. This is so because the bitmap is set to 1 from 4 to 7.

FIG. 12 illustrates one example of a procedure for allocating an FAW MAP for reporting a location estimate.

FIG. 12 is an embodiment illustrating a process for a NAN device 1 (which performs the role of collecting location information) allocates an FAW MAP for reporting a location estimate to a NAN device 2 (which performs the role of reporting location information). As shown in FIG. 12, the NAN device 1 allocates an FAW to the NAN device 2 through a service discovery frame. Also, the NAN device 2 may report a location estimate estimated during a section indicated by the FAW MAP through a service discovery frame.

In what follows, a specific embodiment in which location of a NAN device is measured in a WLAN system is described.

First, a first station corresponds to a NAN device that does not know its location information, a second station corresponds to a NAN device that knows its location information and is located within a distance of one hop from the first station, and a third station corresponds to a NAN device that knows its location information and is located within a distance of at least one hop from the second station. The availability window may correspond to an FAW for reporting a value estimated by the first station.

The first station receives allocation information of an availability window, location information of the second station, and location information of the third station through the service discovery frame during a preset discovery window. The location information of the second station may include the MAC address, longitude, latitude, altitude, transmission power, and place name (string value) of the second station. The location information of the third station may include the MAC address, longitude, latitude, altitude, RSSI (Received Signal Strength Indication), RTD (Round Trip Delay) and place name (string value) of the third station. Also, since the second station is located within a distance of one hop from the first station, if the third station is located within a distance of one hop from the second station, the third station may be located within a distance of two hops from the first station.

The second station and the third station may become an anchor master that knows its location information.

The first station determines a location estimate of the first station by using the location information of the second station and the location information of the third station. In other words, the first station may estimate its location as the intersection point formed by overlapping of a radius of signal strength received by the second station with a radius of signal strength received by the third station.

The first station may report the determined location estimate of the first station during a section indicated by the allocation information of the availability window. At this time, the allocation information of the availability information may be represented by a bitmap, and the section indicated by the allocation information of the availability window may be configured by the bitmap after the preset discovery window is initiated. Also, the determined location estimate of the first station may be reported through the service discovery frame.

Figure 13:
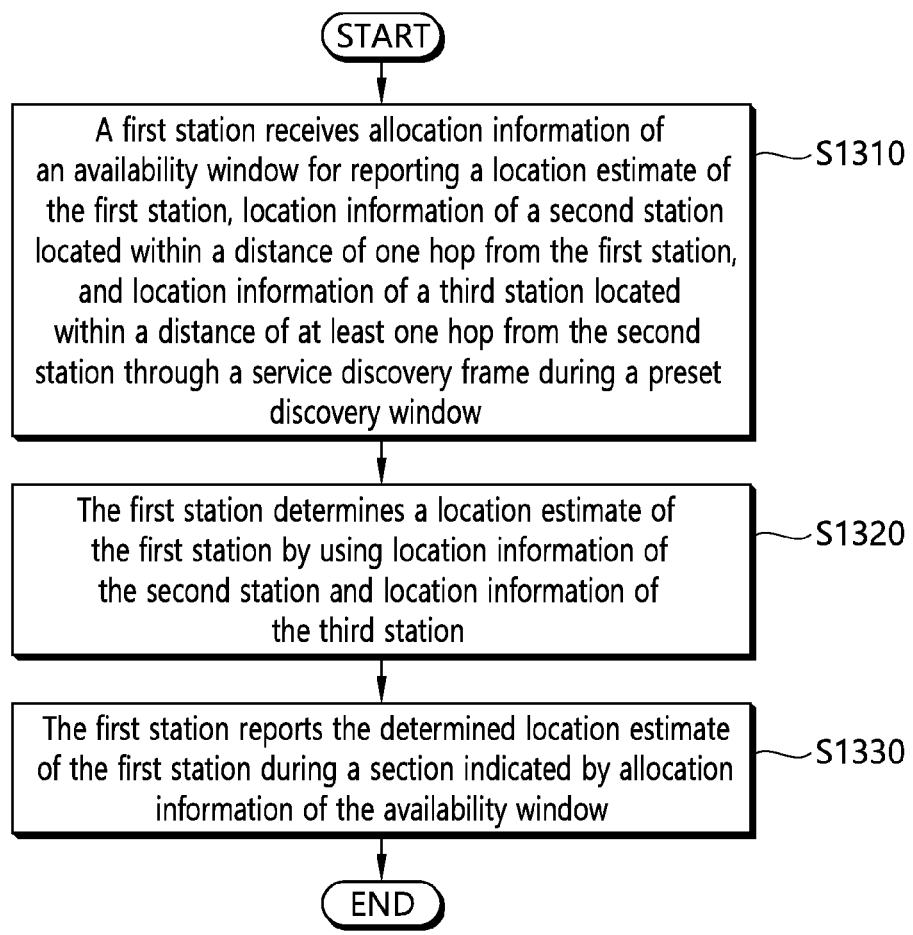
FIG. 13 is a flow diagram illustrating a procedure for measuring location of a NAN device in a WLAN system according to an embodiment of the present invention.

FIG. 13 is a flow diagram illustrating a procedure for measuring location of a NAN device in a WLAN system according to an embodiment of the present invention.

First, a first station corresponds to a NAN device that does not know its location information, a second station corresponds to a NAN device that knows its location information and is located within a distance of one hop from the first station, and a third station corresponds to a NAN device that knows its location information and is located within a distance of at least one hop from the second station. The availability window may correspond to an FAW for reporting a value estimated by the first station.

In the S1310 step, the first station receives allocation information of an availability window, location information of the second station, and location information of the third station through the service discovery frame during a preset discovery window. The location information of the second station may include the MAC address, longitude, latitude, altitude, transmission power, and place name (string value) of the second station. The location information of the third station may include the MAC address, longitude, latitude, altitude, RSSI (Received Signal Strength Indication), RTD (Round Trip Delay) and place name (string value) of the third station. Also, since the second station is located within a distance of one hop from the first station, if the third station is located within a distance of one hop from the second station, the third station may be located within a distance of two hops from the first station.

In the S1320 step, the first station determines a location estimate of the first station by using the location information of the second station and the location information of the third station. In other words, the first station may estimate its location as the intersection point formed by overlapping of a radius of signal strength received by the second station with a radius of signal strength received by the third station.

In the S1330 step, the first station may report the determined location estimate of the first station during a section indicated by the allocation information of the availability window. At this time, the allocation information of the availability information may be represented by a bitmap, and the section indicated by the allocation information of the availability window may be configured by the bitmap after the preset discovery window is initiated.

Figure 14:
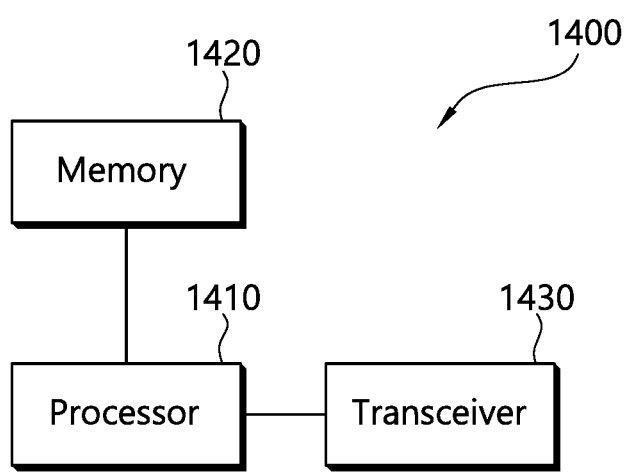
FIG. 14 illustrates a block diagram of a wireless device in which an embodiment of the present invention may be implemented.

FIG. 14 is a block diagram of a wireless device in which an embodiment of the present invention may be implemented.

The wireless device 1400 comprises a processor 1410, memory 1420, and transceiver 1430. The wireless device may be a NAN device described in the embodiment of the present invention above. The transceiver 1430, being connected to the processor 1410, transmits and/or receives radio signals. The processor 1410 implements proposed functions, processes, and/or methods. In the embodiment described above, the operation of a NAN device may be implemented by the processor 1410. The memory 1420, being connected to the processor 1410, may store instructions for implementing the operation of the processor 1410.

The processor may include an application-specific integrated circuit (ASIC), another chip set, a logical circuit, a data processing device, and/or a converter converting a baseband signal and a radio signal to and from one another. The memory may include a read-only memory (ROM), a random access memory (RAM), a flash memory, a memory card, a storage medium, and/or another storage device. The RF unit may include one or more antennas transmitting and/or receiving radio signals. When the exemplary embodiment is implemented as software, the above-described method may be implemented as a module (process, function, and so on) performing the above-described functions. The module may be stored in the memory may be executed by the processor. The memory may be located inside or outside of the processor and may be connected to the processor through a diversity of well-known means.

In the exemplary system describe above, methods are described according to a flow diagram by using a series of steps and blocks. However, the present invention is not limited to a specific order of the steps, and some steps may be performed with different steps and in a different order from those described above or simultaneously. Also, it should be understood by those skilled in the art that the steps shown in the flow diagram are not exclusive, other steps may be further included, or one or more steps of the flow diagram may be deleted without influencing the technical scope of the present invention.

What is claimed is:

1. A method in a wireless LAN system, comprising:
   receiving, by a first station, allocation information of an availability window for reporting a location estimate of the first station, location information of a second station located within a distance of one hop from the first station, and location information of a third station located within a distance of at least one hop from the second station through a service discovery frame during a preset discovery window;
   determining, by the first station, a location estimate of the first station by using location information of the second station and location information of the third station; and
   reporting, by the first station, the determined location estimate of the first station during a section indicated by allocation information of the availability window.

2. The method of claim 1, wherein the location information of the second station includes MAC address, longitude, latitude, altitude, transmission power, and place name of the second station.

3. The method of claim 1, wherein the location information of the third station includes MAC address, longitude, latitude, altitude, RSSI (Received Signal Strength Indication), RTD (Round Trip Delay), and place name of the third station.

4. The method of claim 1, wherein allocation information of the availability window is represented by a bitmap, and a section indicated by the allocation information of the availability window is configured by the bitmap after the preset discovery window is initiated.

5. The method of claim 1, wherein the second station and the third station are an anchor masters.

6. The method of claim 1, wherein the determined location estimate of the first station is reported through a service discovery frame.

7. A wireless device operating in a wireless LAN system, comprising:
   a transceiver transmitting and receiving a radio signal; and
   a processor connected to the transceiver, wherein the processor is configured to:
   receive allocation information of an availability window for reporting a location estimate of a first station, location information of a second station located within a distance of one hop from the first station, and location information of a third station located within a distance of at least one hop from the second station through a service discovery frame during a preset discovery window;
   determine a location estimate of the first station by using the location information of the second station and the location information of the third station; and
   report the determined location estimate of the first station during a section indicated by the allocation information of the availability window.

8. The wireless device of claim 7, wherein the location information of the second station includes MAC address, longitude, latitude, altitude, transmission power, and place name of the second station.

9. The wireless device of claim 7, wherein the location information of the third station includes MAC address, longitude, latitude, altitude, RSSI (Received Signal Strength Indication), RTD (Round Trip Delay), and place name of the third station.

10. The wireless device of claim 7, wherein allocation information of the availability window is represented by a bitmap, and a section indicated by the allocation information of the availability window is configured by the bitmap after the preset discovery window is initiated.

11. The wireless device of claim 7, wherein the second station and the third station are an anchor masters.

12. The wireless device of claim 7, wherein the determined location estimate of the first station is reported through a service discovery frame.

* * * * *